(12) United States Patent
Hauser et al.

(10) Patent No.: US 7,607,137 B2
(45) Date of Patent: Oct. 20, 2009

(54) INTEGRATION OF HETEROGENEOUS APPLICATIONS

(75) Inventors: Andreas Hauser, Dielheim-Horrenberg (DE); Pranav Bihari, Wiesloch (DE); Bernd Schmitt, Bruchsal (DE); Laszlo Szervaczius, Bad Schönborn (DE)

(73) Assignee: SAP AG, Walldorf (DE)

( * ) Notice: Subject to any disclaimer, the term of this patent is extended or adjusted under 35 U.S.C. 154(b) by 632 days.

(21) Appl. No.: 10/188,352

(22) Filed: Jul. 1, 2002

(65) Prior Publication Data

US 2004/0002944 A1 Jan. 1, 2004

(51) Int. Cl.
*G06F 9/46* (2006.01)
*G06F 15/16* (2006.01)
*G06F 13/00* (2006.01)
*G06F 15/177* (2006.01)

(52) U.S. Cl. .................. 719/318; 719/310; 709/201; 709/203; 709/217; 709/219; 709/230; 715/733; 715/734; 715/740; 715/742

(58) Field of Classification Search ......... 719/310–332; 707/102, 1, 100, 3; 709/250, 201–246; 704/228; 718/100–108; 715/733, 734, 736, 740, 742
See application file for complete search history.

(56) References Cited

U.S. PATENT DOCUMENTS

| | | | | |
|---|---|---|---|---|
| 6,144,990 | A * | 11/2000 | Brandt et al. | 709/203 |
| 6,188,401 | B1 * | 2/2001 | Peyer | 715/805 |
| 6,654,784 | B1 * | 11/2003 | Wei | 709/203 |
| 6,675,228 | B1 * | 1/2004 | Bahrs et al. | 719/318 |
| 6,725,281 | B1 * | 4/2004 | Zintel et al. | 719/318 |
| 6,735,602 | B2 * | 5/2004 | Childress et al. | 707/200 |
| 6,842,906 | B1 * | 1/2005 | Bowman-Amuah | 719/330 |
| 6,845,507 | B2 * | 1/2005 | Kenton | 719/314 |
| 6,859,783 | B2 * | 2/2005 | Cogger et al. | 705/10 |
| 6,922,812 | B2 * | 7/2005 | Broussard et al. | 715/236 |
| 7,007,094 | B1 * | 2/2006 | Linderman | 709/230 |
| 7,072,984 | B1 * | 7/2006 | Polonsky et al. | 709/246 |
| 7,177,859 | B2 * | 2/2007 | Pather et al. | 707/3 |
| 7,188,158 | B1 * | 3/2007 | Stanton et al. | 709/220 |
| 7,269,664 | B2 * | 9/2007 | Hutsch et al. | 709/246 |
| 7,299,274 | B2 * | 11/2007 | Rajarajan et al. | 709/223 |
| 2001/0044849 | A1 * | 11/2001 | Ndili et al. | 709/230 |
| 2002/0010804 | A1 * | 1/2002 | Sanghvi et al. | 709/318 |
| 2002/0026533 | A1 * | 2/2002 | Dutta et al. | 709/313 |
| 2002/0065650 | A1 * | 5/2002 | Christensson et al. | 704/228 |
| 2002/0138563 | A1 * | 9/2002 | Trivedi | 709/203 |
| 2002/0178294 | A1 * | 11/2002 | Creamer et al. | 709/250 |
| 2003/0055829 | A1 * | 3/2003 | Kambo et al. | 707/100 |
| 2003/0097448 | A1 * | 5/2003 | Menezes et al. | 709/227 |
| 2003/0149722 | A1 * | 8/2003 | Jolley et al. | 709/203 |
| 2003/0200192 | A1 * | 10/2003 | Bell et al. | 707/1 |

FOREIGN PATENT DOCUMENTS

WO WO 98/49618 11/1998

* cited by examiner

*Primary Examiner*—Lewis A Bullock, Jr.
*Assistant Examiner*—Jennifer N To
(74) *Attorney, Agent, or Firm*—Schwegman, Lundberg & Woessner, P.A.

(57) ABSTRACT

Methods and apparatus for integrating heterogeneous applications. A method includes distributing an event from a first application of a first system to a second application of a second system. The event specifies at least one of an object and an operation in the second system. Distributing the event causes the second system to handle the event using the at least one of the object and the operation.

21 Claims, 10 Drawing Sheets

INTEGRATION OF HETEROGENEOUS APPLICATIONS

BACKGROUND

This invention relates to integrating computer programs.

Different types of computer programs can be used to process different business activities in a company. For example, a customer relationship management (CRM) application can be used to process customer relationship activities, a supply chain management (SCM) application can be used to process production activities, and a product lifecycle management (PLM) application can be used to manage information across the whole spectrum of business activities in a company.

A first and second of such applications can have incompatible formats for processes and data. For example, the first application can produce output data in a format that is incompatible with a format of input data for the second application. The first and second applications will be referred to as heterogeneous applications. Furthermore, the first application can reside on a first computer system having formats for processes and data while the second application can reside on a second computer system that has formats for processes and data that is different from the formats of the first computer system. The systems can be produced by different companies that are unwilling or unable to agree to a standard format for processes and data. The first and second computer systems will be referred to as heterogeneous computer systems.

Heterogeneous computer systems can include one or more back-end components, such as a data server, and one or more middleware components, such as an application server. Heterogeneous computer systems can also include one or more front-end components, such as a client computer having a graphical user interface or a Web browser. The components of the system can be interconnected by any form or medium of digital data communication, such as a communication network. Examples of communication networks include a local area network ("LAN"), a wide area network ("WAN"), and the Internet.

Heterogeneous computer systems can include clients and servers. A client and server are generally remote from each other and typically interact through a communication network. The relationship of client and server arises by virtue of computer programs running on the respective computers and having a client-server relationship to each other.

A user will often interact with two or more heterogeneous computer systems from a single front end component that can be part of both heterogeneous computer systems. For example, the user can, through a Web browser on a desktop computer, interface with two heterogeneous applications that are executed by heterogeneous computer systems.

SUMMARY

The present invention provides methods and apparatus, including computer program products, for integrating heterogeneous applications.

In general, in one aspect, a method for integrating heterogeneous applications includes distributing an event from a first application of a first system to a second application of a second system at a front end component. The event specifies at least one of an object and an operation in the second system. Distributing the event causes the second system to handle the event using the at least one of the object and the operation.

Implementations of this or any other aspect can include one or more of the following features. Distributing the event can include formatting the event using a protocol shared with the second system by, e.g., formatting the event to a semantic protocol standard shared with the second system. The semantic protocol can be, e.g., one of ebXML, EDI-X12, and WDSL/UDDI. Distributing the event can include distributing a key that can be mapped to identify data in the second system. The event can be distributed from a user interface to, e.g., a Web service.

The method for integrating heterogeneous applications can also include receiving user input specifying the event, receiving the event from the first system, parsing the received event, or receiving a key of the object from the second system.

In general, in another aspect, a computer program product for integrating heterogeneous applications includes instructions to cause a processor to render a first user interface, receive user input through the first user interface, the user input specifying at least one of data from a second system and a process from the second system, and identify the specified data or process to a second interface to cause the second system to access the specified data or process. The instructions can be tangibly stored on a machine-readable medium.

Implementations of this or any other aspect can include one or more of the following features. The first user interface can be rendered at a front end component, and the instructions can also cause the processor to render the second user interface at the front end component. The instructions can cause the processor to distribute an event to the second interface to identify the specified data or process to the second user interface or distribute a key of the specified data or process to the second user interface.

The instructions can cause the processor to format a communication using a protocol shared with the second user interface to identify the specified data or process to the second user interface or to receive the specified data or process, or a result of performing the specified process on the specified data, from the second system. A technical protocol that is shared with the second user interface can be used to identify the specified data or process to the second user interface, or one of a name, an attribute name, and an object name can be used to identify the specified data or process to the second user interface. Also, one of an XML string and an XML file can be used to identify the specified data or process to the second user interface.

The instructions can cause the processor to use a semantic protocol shared with the second user interface to identify the specified data or process to the second user interface. The semantic protocol can be, e.g., one of ebXML, X12, and UDDI. The instructions can cause the processor to identify the specified data or process to a second graphical user interface.

The instructions can cause the processor to render a user interface in a browser page at the front end and identify the specified data or process to a second user interface in the same browser page. The first user interface can be rendered at a front end client.

The invention can be implemented to realize one or more of the following advantages. A system in accordance with the invention integrates heterogeneous applications. The system facilitates interactions of the heterogeneous applications at a front end component of a computer system. The system can achieve integration without tight backend integration of the applications, or in the presence of backend integration. In particular, the system defines business objects and/or processes of heterogeneous applications so that the heterogeneous applications can identify and use the business objects and/or processes for further processing.

The details of one or more implementations of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
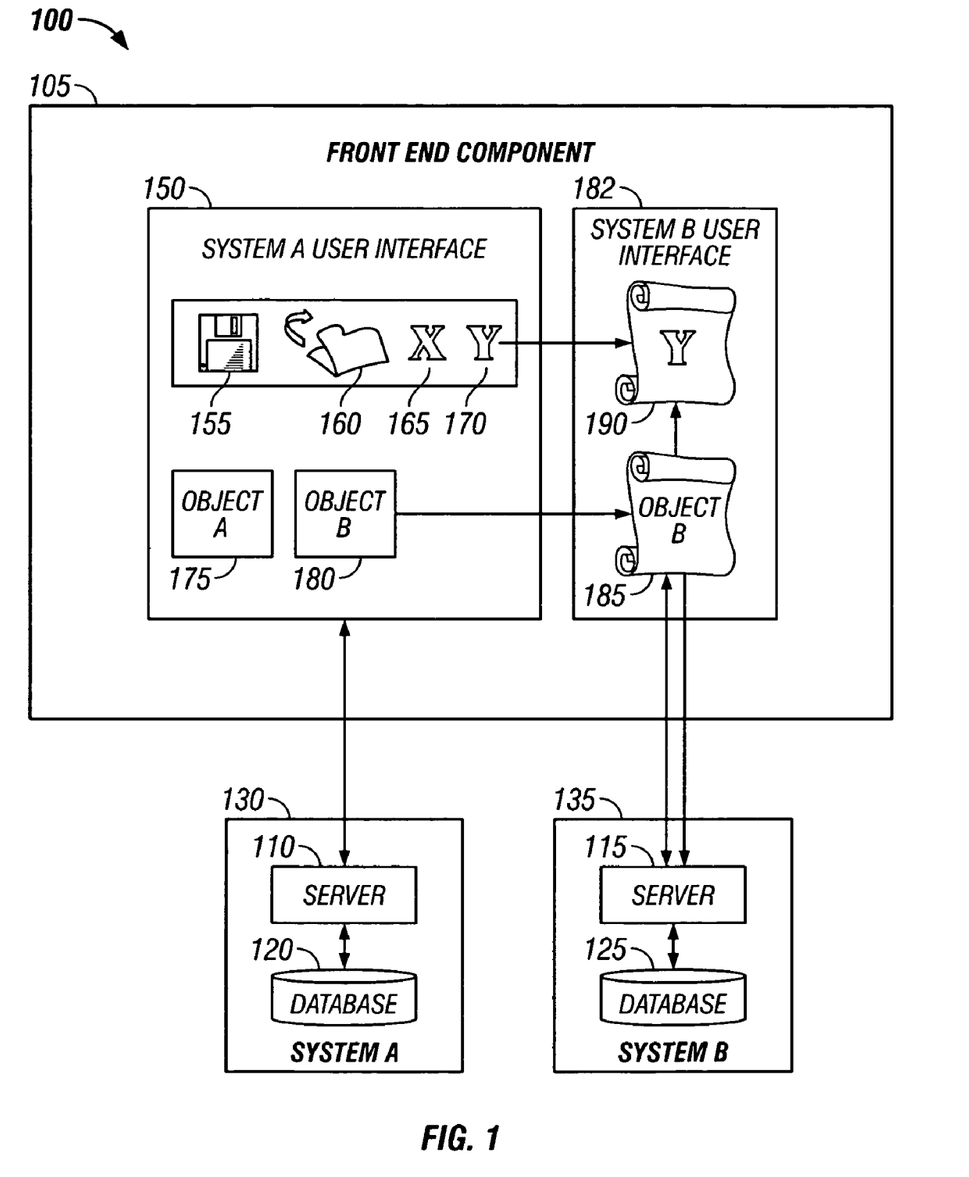
FIG. 1 is a pictorial representation of integrated heterogeneous applications.

As shown in FIG. 1, a system landscape 100 includes a front end component 105, application servers 110, 115, and databases 120, 125. Front-end component 105 can be a client computer and can provide one or more interfaces for a user to access data and operations of one or more systems. Front-end component 105 is typically a computer, a terminal, or a personal digital assistant (PDA) that communicates with application servers 110, 115 over a communications network. Application server 110 of a system A 130 executes computer programs that process a first activity. Application server 115 of a system B 135 executes computer applications that processes a second activity. The first and second activities can be, for example, business related activities such as project development and product lifecycle management. Database 120 stores data that is used by system A 130 to process the first business activity and database 125 stores data that is used by system B 135 to process the second business activity. The computer programs that the application servers execute can include business applications.

Front end component 105 receives instructions from system A 130 that relate to the creation and display of a system A user interface 150 and, furthermore, allow access to operations and data in system A 130 from front end component 105. For example, user interface 150 includes selectable command icons 155, 160, 165, 170 that allow a user to specify operations that are to be performed on data. Command icon 155 allows a user to specify that data is to be saved, command icon 160 allows a user to specify that data is to be opened or displayed, and command icons 165, 170 allow a user to specify other operations that are to be performed. User interface 150 also includes data icons 175, 180. Data icon 175 identifies a data object A and data icon 180 identifies a data object B. User interface 150 allows a user to select the data object upon which operations are to be performed using data icons 175, 180.

Front end component 105 receives instructions from system B 135 that relate to the creation of a system B user interface 182. System B user interface 182 allows access to operations and data in system B 135 from front end component 105. For example, system B user interface 182 allows a user to access an operation 185 from system B 135 and data object B 185 from system B. Operation 185 is identified by command icon 170 on user interface 150. Data object B 185 is identified by data icon 180 on user interface 150.

System A user interface 150 and system B user interface 182 can be any of a number of different interfaces or user interfaces that execute on front end system 105. For example, interfaces 150 and 182 can be user interfaces that execute on an operating system, portals or similar display environments, Web service applications that interact with each other, or interfaces built with Web service user interfaces with .NET iViews or Java iViews.

System B 135 is loosely integrated with system A 130 at front end component 105. In particular, system A user interface 150 distributes information, such as events, to system B user interface 182 at front end component 105 to access operations and data from system B 135. An event includes information that specifies one or more data objects and one or more operations associated with the one or more data objects. Interfaces 150, 182 can communicate events in one or both directions using standardized communication formats. This exchange of information between user interfaces 150, 182 at front end component 105 allows a user who interacts with system A user interface 150 to call operations and retrieve data from system B 135 without requiring tight standardization in the formats of objects and instructions in middleware and/or back end components. For example, system B 135 can be integrated with system A 130 even though they are produced by different manufacturers or by the same manufacturer at different times when formats have changed. Alternatively, the information exchanged can be other types of information such as index keys and metadata.

Figure 2:
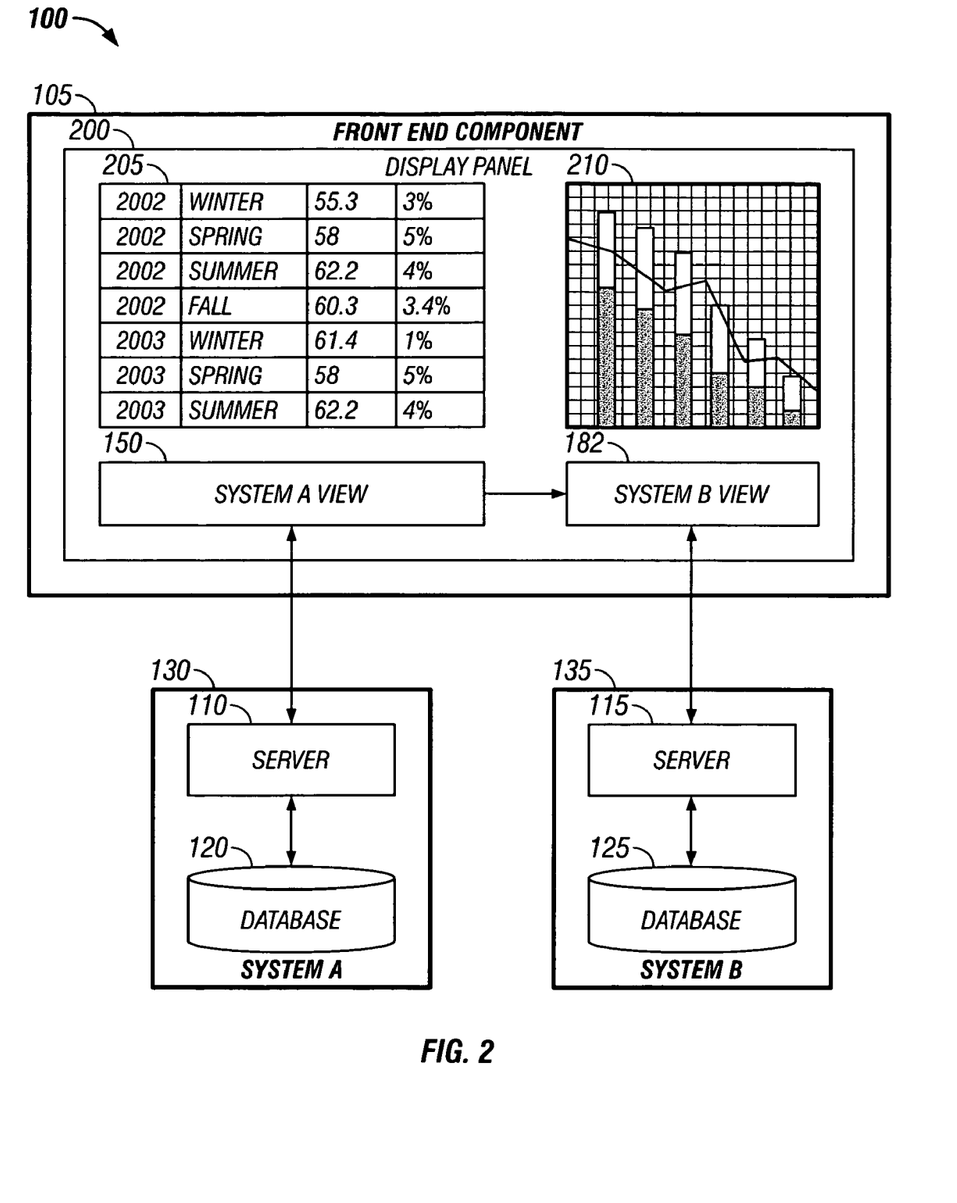
FIG. 2 shows an implementation of a system landscape where heterogeneous applications are integrated.

FIG. 2 shows one example of front end component 105 in which system A 130 and system B 135 are integrated by exchanging events at a front end component such as front end component 105. Front end component 105 includes a display panel 200 that can be, for example, a browser window, a portal page, or other area for the display of user interfaces that originate from heterogeneous applications. Display panel 200 includes discrete subsections 205, 210 that, along with system A user interface 150 and system B user interface 182, display a self-contained selection of content to a user. For example, subsection 205 displays a table to a user and subsection 210 displays a graph to a user. Subsections 205, 210, system A user interface 150 and system B user interface 182 can be, e.g., HTML frames, portlets, or iViews displayed within display panel 200.

In operation, system A 130 and system B 135 can be integrated by exchanging events between system A user interface 150 and system B user interface 182. In particular, system A user interface 150 can act as an event source, while system B user interface 182 can act as an event sink. The exchange of events, and hence the coupling between system A 130 and system B 135, can occur at different eventing levels. For example, system A user interface 150 can distribute an event to which system B user interface 182 subscribes, so that the event is handled by system B user interface 182. Alternatively, a Web service or a other intermediate can be used to exchange events.

Figure 3:
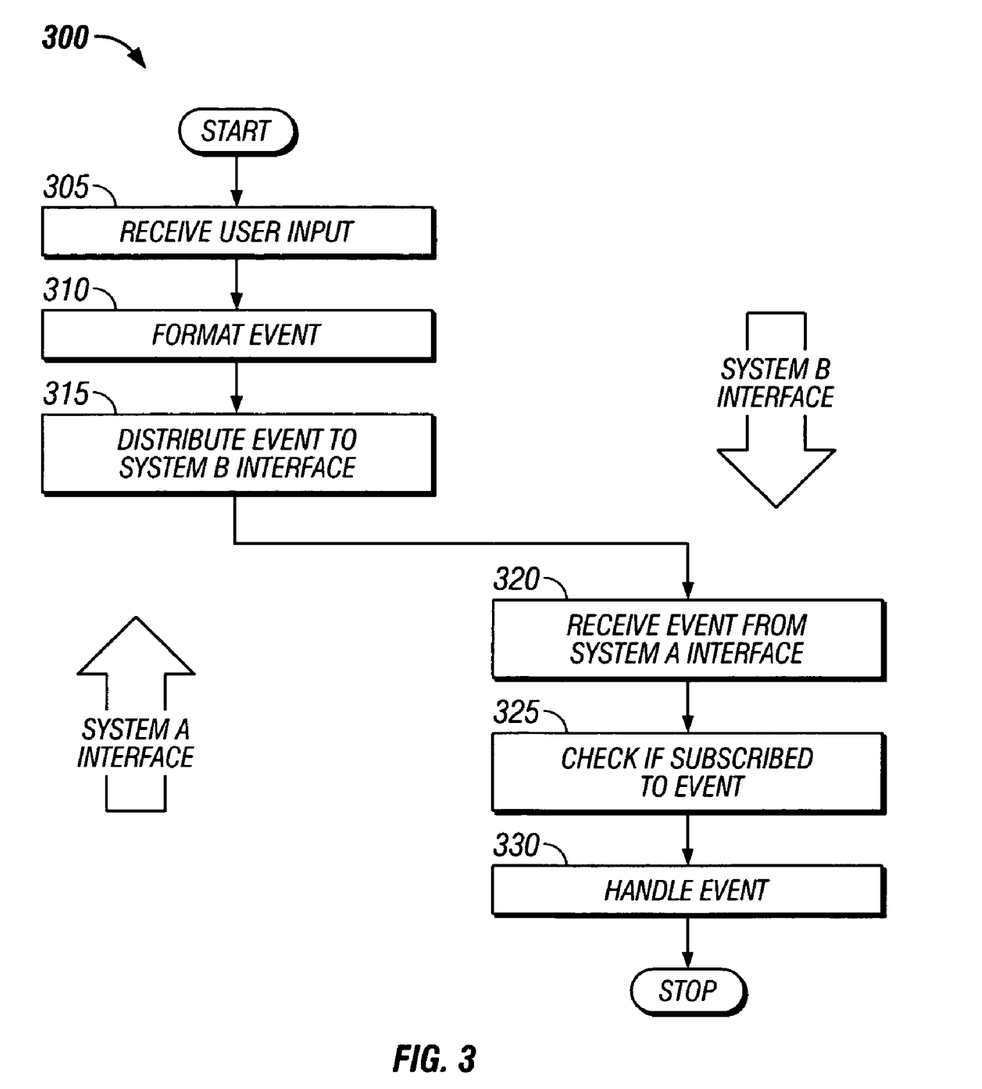
FIG. 3 shows a method in accordance with the invention for integrating heterogeneous applications.

FIG. 3 shows a method 300 whereby system A user interface 150 and system B user interface 182 exchange an event to trigger an action. System A user interface 150 receives user input that selects an event (step 305). For example, the event can specify that data from data object 185 is to be displayed in system B user interface 182.

System A user interface 150 formats the event for communication with system B user interface 182 (step 310). For example, system A user interface 150 can use shared technical and semantic protocols to communicate the event to system B user interface 182. Example technical protocol formats include event namespace, attribute-value pairs, extensible markup language (XML) string/file, scripting objects such as JavaScript or VBScript, and serialized Java objects. Example semantic protocol standards include electronic business using XML (ebXML), electronic data interchange (EDI-X12), and the wireless digital subscriber line (WDSL)/Universal Description Discovery Integration (UDDI)/Web services framework. Regardless of the specific protocol used, system A user interface 150 converts the event into a form that can be recognized by system B user interface 182 at front end component 105.

System A user interface 150 distributes the formatted event to system B user interface 182 within front end component 105 (step 315). System B user interface 182 receives the formatted event (step 320) and checks to see if it subscribes to the received event (step 325). If system B user interface 182 subscribes to the event, then system B user interface 182 handles the event (step 330). For example, if the event specifies that data from data object 185 is to be displayed in system B user interface 182, then system B user interface 182 retrieves data object 185 and instructions for displaying data object 185 from application server 115 and database 125.

Figure 4:
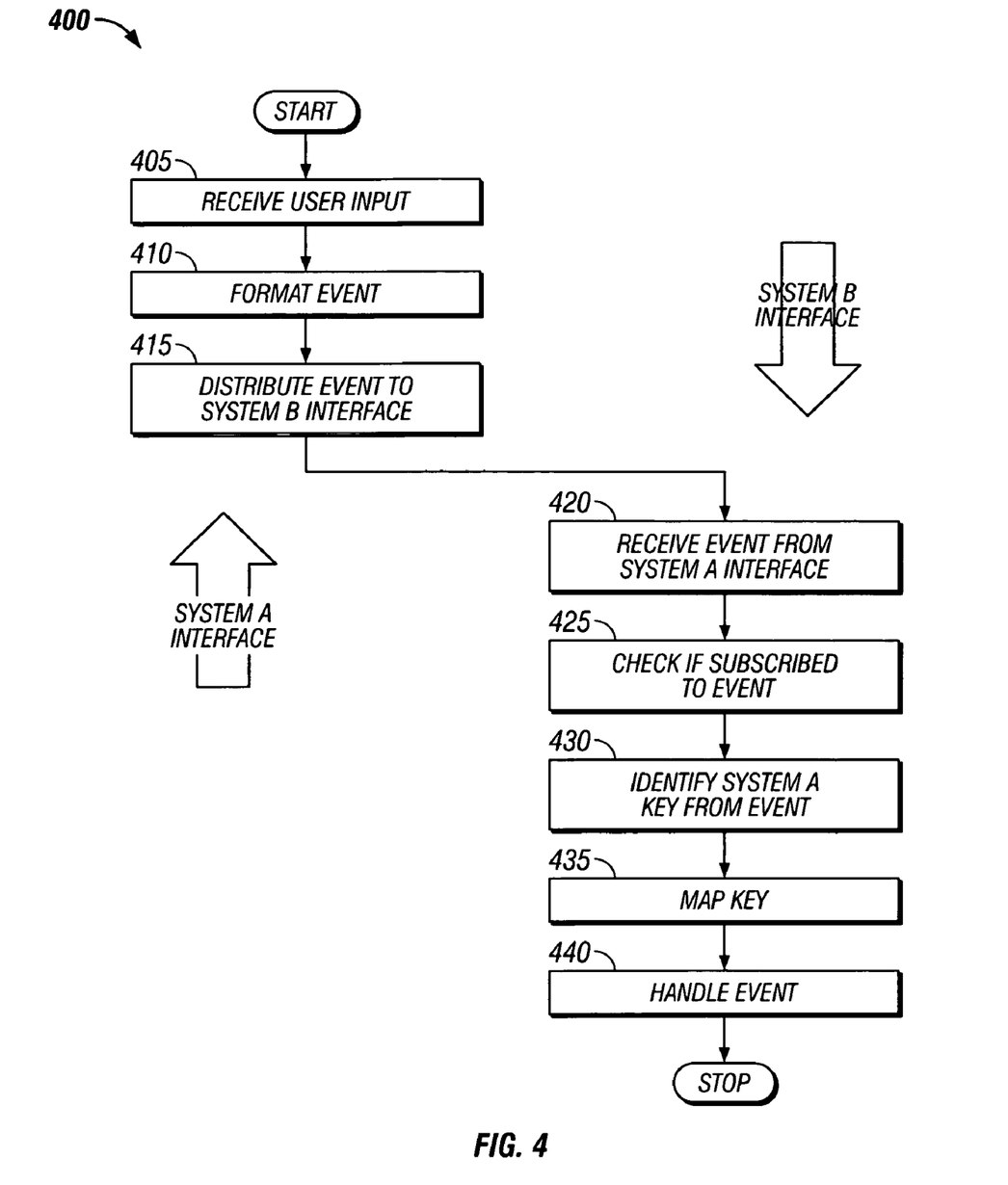
FIG. 4 shows another method in accordance with the invention for integrating heterogeneous applications.

FIG. 4 shows a method 400 whereby system A user interface 150 and system B user interface 182 exchange an object key of an object specified by an event. The exchanged object key need not be valid in both system A 130 and system B 135. For example, the exchanged key can be valid for identifying a record in system A 130, but may be meaningless in system B 135. System A user interface 150 receives user input that selects the event (step 405). For example, the event can specify the display of a data object that is located in a table in system B 135. System A user interface 150 formats the event (step 410) and distributes the formatted event to system B user interface 182 (step 415).

System B user interface 182 receives the formatted event (step 420) and checks to see if it subscribes to the received event (step 425). If system B user interface 182 subscribes to the event, then system B user interface 182 identifies the system A key to the object specified by the event (step 430). The identified key can be valid only in system A 130, or the identified key can be valid in both system A 130 and system B 135. If necessary, system B user interface 182 maps the key into a second key that is valid in system B 135 (step 435). In addition to mapping a key, system B user interface 182 can map a field or other data that is valid in system A 130 to a field or other data that is valid in system B 135. In order to map a key or other data, system B user interface 182 can access a data mapping system that describes the correspondence between data in system A 130 and system B 135, as discussed further below. System B user interface 182 handles the event using the data object identified by the mapped data (step 440).

Alternatively, system B user interface 182 can format the mapped key or other data and return the formatted, mapped key or data to system A user interface 150. System B user interface 182 can use the same technical and semantic protocols that were used by system A 130 to format the event. System A user interface 150 can then employ the mapped key or data to directly access the object in system B 135, as needed.

Figure 5:
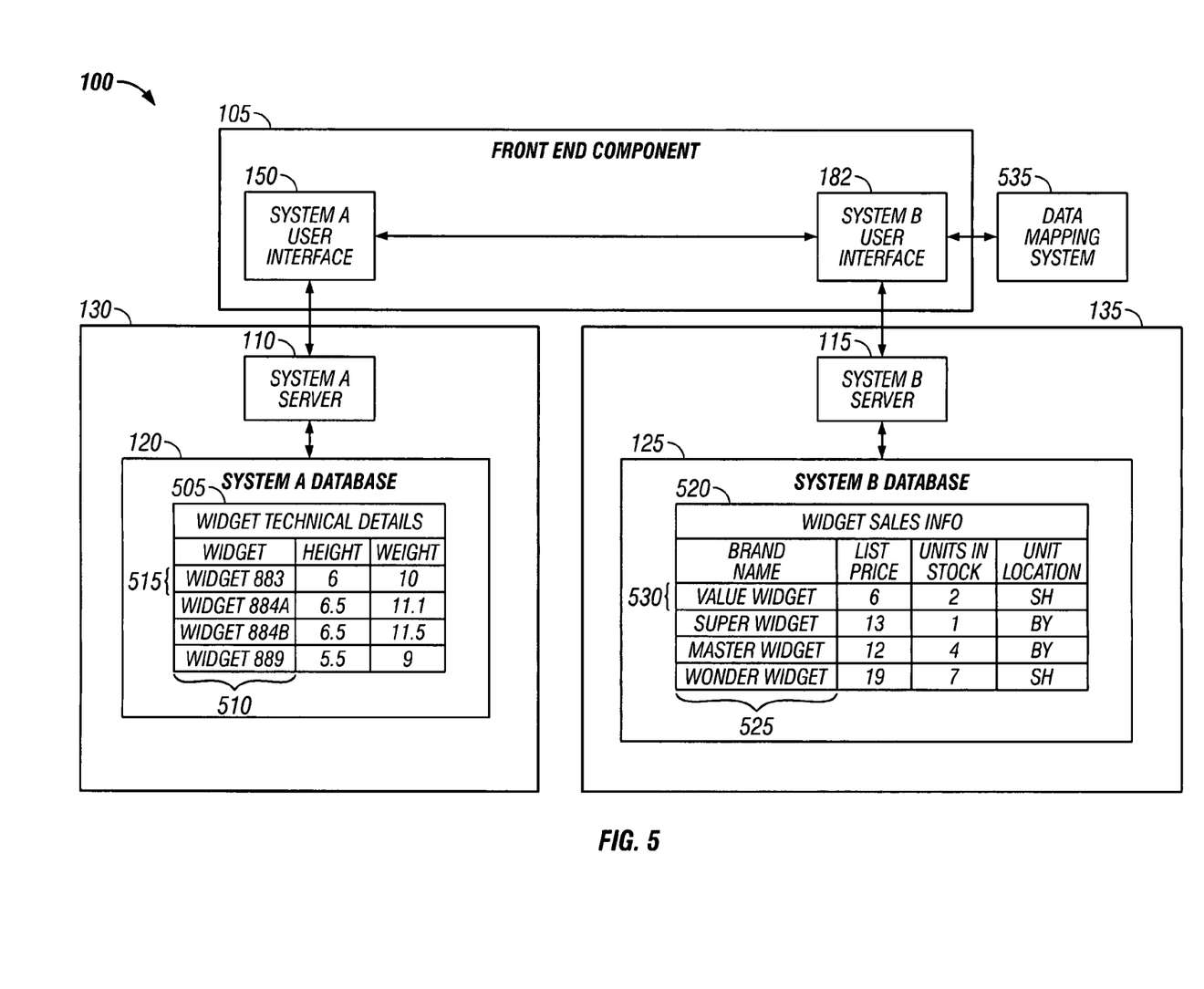
FIG. 5 shows an implementation of another system landscape where heterogeneous applications are integrated.

FIG. 5 shows system landscape 100 where data mapping can be performed to integrate system A 130 and system B 135 at front end component 105. System A database 120 can include a table 505 with a primary key field 510 and a data record 515. System B database 125 can include a data table 520 with a primary key field 525 and a data record 530. Data table 505 can describe, e.g., the technical details of products for a supply chain management (SCM) system while data table 520 can describe sales information about products for a customer relationship management (CRM) system.

The format of the contents of the data records in both tables 505, 520 need not be identical in primary key fields 510 and 515. For example, data record 515 can contain a product number (e.g., "Widget 883") in primary key field 510, while data record 530 can contain a brand name (e.g., "Value Widget") in primary key field 525. This discrepancy can prevent system A user interface 150 from directly accessing the content of data table 520.

In this case, system landscape 100 can also include a data mapping system 535 that includes information about the relationship between data in heterogeneous applications. Data mapping system 535 can include information for mapping keys or mapping fields, and can be implemented, e.g., as a database of relationships or a collection of rules that describe the relationships between data. For example, data mapping system 535 can describe the relationships between the data in key field 510 and key field 525 in, e.g., a table that identifies the correspondence between the product numbers in key field 510 and the brand names of the products in key field 525. System B user interface 182 can access data mapping system 535 to map the key received from system A user interface 150 and handle the event.

Figure 6:
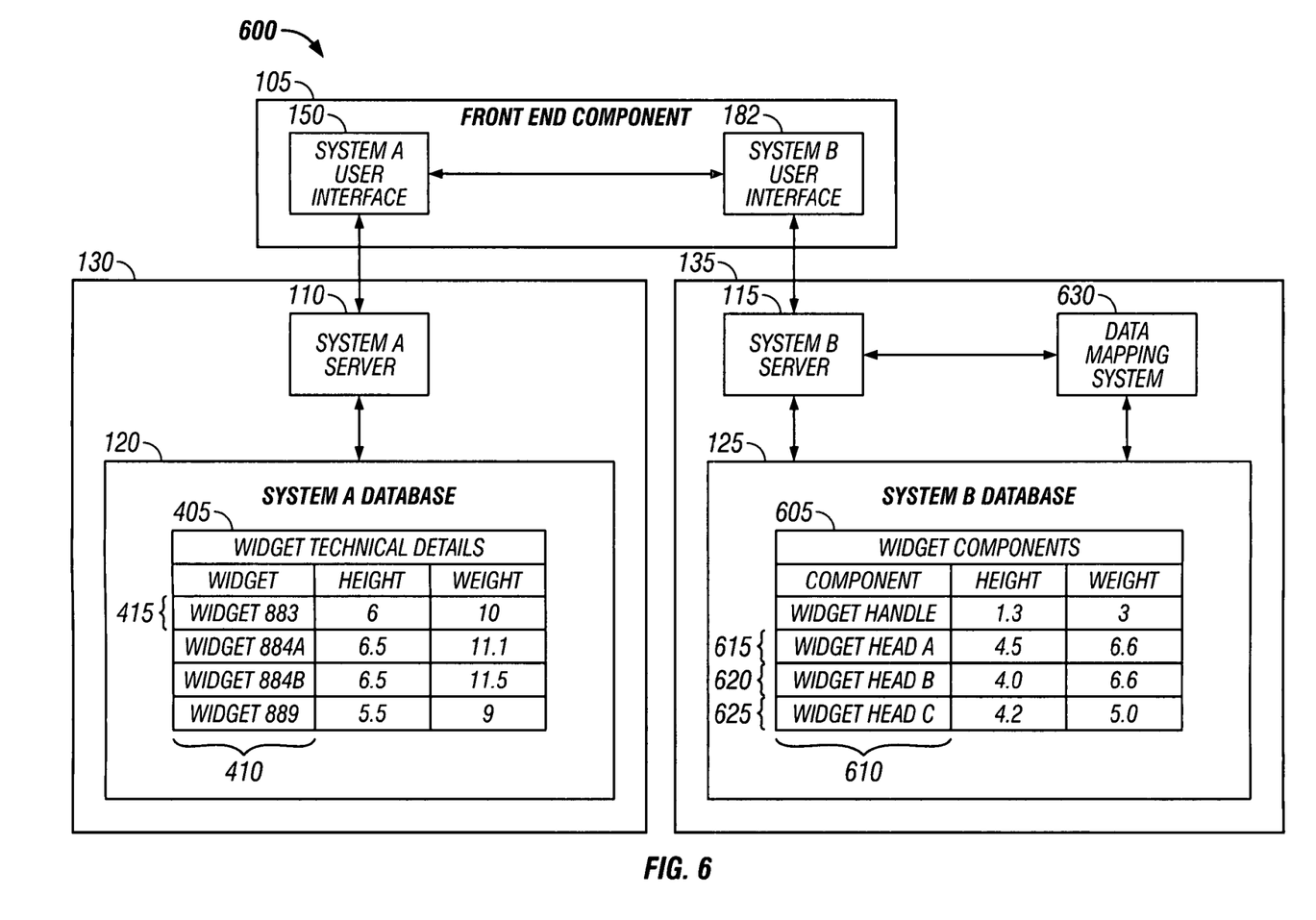
FIG. 6 shows an implementation of another system landscape where heterogeneous applications are integrated.

FIG. 6 shows an alternative system landscape 600 where data mapping can be performed to integrate system A 130 and system B 135 at front end component 105. System B database 125 can include a data table 605 with a primary key field 610 and data records 615, 620, 625. Data table 605 can describe the same products described in data table 505 but using different information. For example, data table 605 can describe the technical details of various components used to assemble the products described in data table 505. The description can include detailed information about the components that is not included in data table 505.

The data in data table 605 is keyed to the component name in primary key field 610 and not to the associated product number (or associated product numbers) in primary key field 510. Therefore, when an event includes the key from primary key field 510 in system A 130, system B 135 maps the key to the component name in primary key field 610. For example, if a user requests the display of the weight of the widget head of widget in record 415, the product number from key field 410 is mapped to identify which widget head record 615, 620, 625 is associated with the widget in record 415.

Furthermore, system B user interface 182 need not perform the data mapping in order for system A 130 and system B 135 to be integrated at front end component 105. For example, data mapping can be performed by system B application server 115. In particular, system B application server 115 can receive an unrecognized key from system B user interface 182 and then map the unrecognized key using a data mapping system 630. System B application server 115 can then return an object identified by the mapped key to system B user interface 182.

Figure 7:
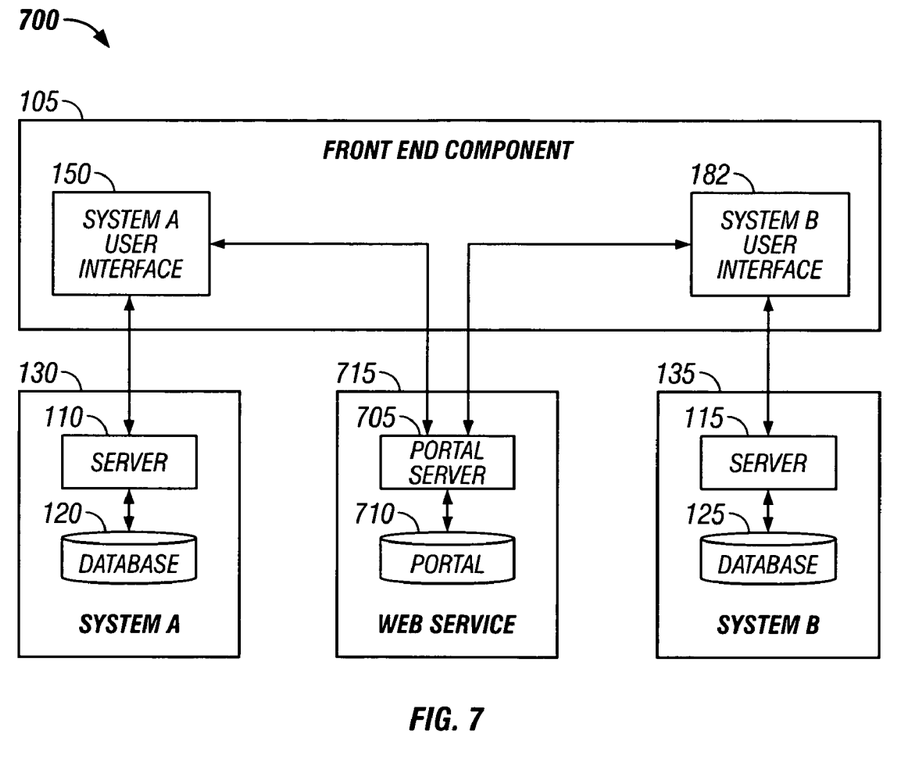
FIG. 7 shows an implementation of another system landscape where heterogeneous applications are integrated.

FIG. 7 shows a system landscape 700 that includes a Web service intermediate to exchange events between system A user interface 150 and system B user interface 182. In addition to front end component 105, application servers 110, 115, and databases 120, 125, system landscape 700 also includes a portal server 705 and a portal storage 710. Portal server 705 executes instructions on portal storage 710 to invoke a Web service 715. Web service 715 is an application component that is accessible by system A user interface 150 and system B user interface 182 using shared protocols such as, e.g., UDDI, SOAP, XML, HTTP, or other Internet protocols. Web service 715 can be, e.g., a self-contained, modular application that can be published, located, and invoked across a communications network such as the Internet. Web service 715 can perform functions such as, e.g., publishing an event and subscribing to an event.

Figure 8:
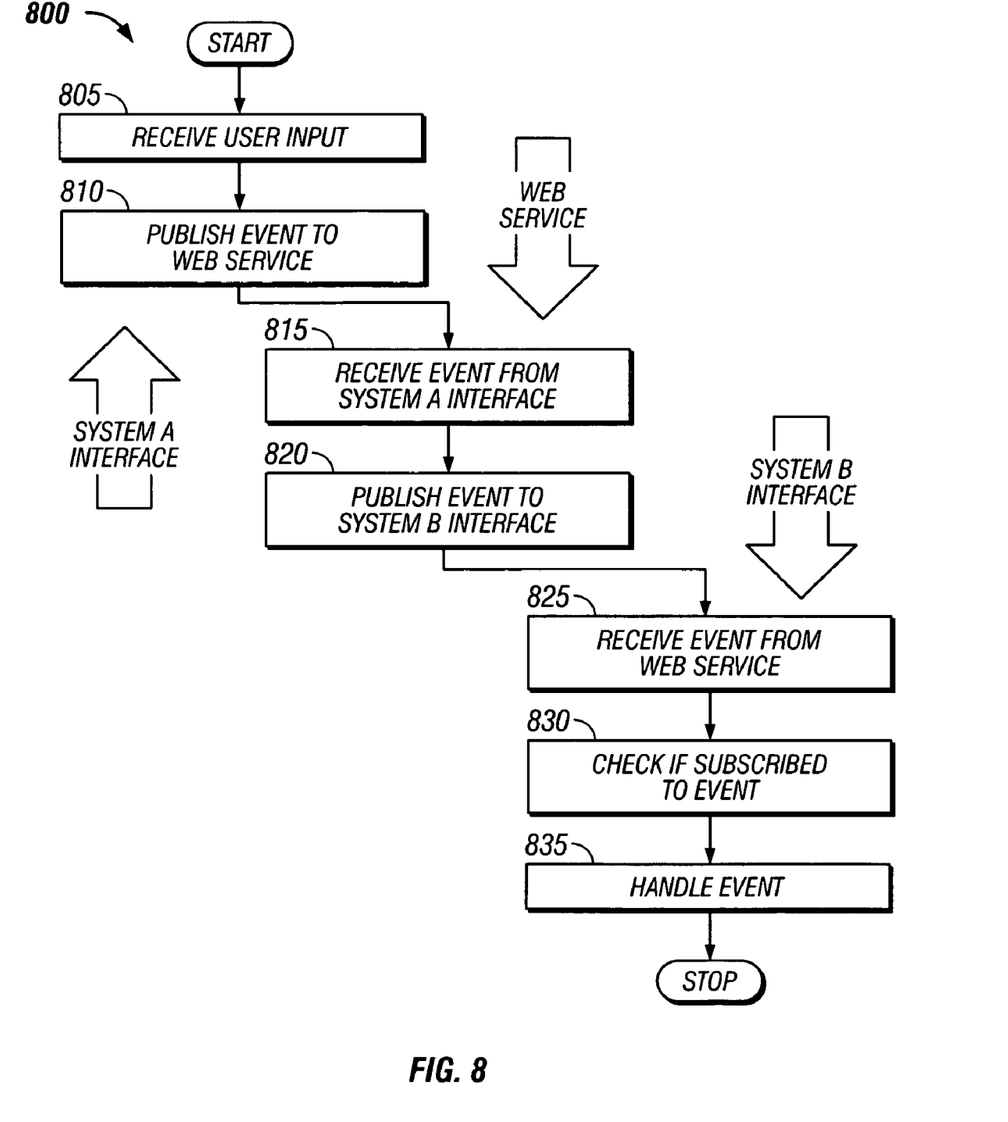
FIG. 8 shows another method in accordance with the invention for integrating heterogeneous applications.

In operation, Web service 715 can be invoked by system A user interface 150 and system B user interface 182 to exchange events. As shown in FIG. 8, in particular, system A user interface 150 can receive user input that selects the event (step 805). System A user interface 150 can publish the event to Web service 715 using a shared protocol (step 810).

Web service 715 receives the event from system A user interface 150 (step 815) and in turn publishes the event to system B user interface 182 (step 820). Web service 715 can publish the event using the same protocol, or using another protocol that is shared with system B user interface 182.

System B user interface 182 receives the event from Web service 715 (step 825) and checks to see if it is subscribed to the event (step 830). If subscribed, system B user interface 182 handles the event (step 835).

In one implementation, front end component 105 receives instructions from portal server 705 that relate to the creation and display of system A user interface 150 and system B user interface 182. In this case, portal server 705 receives user input over system A user interface 150 and distributes an event to system B user interface 182, which in turn accesses system B 135 to handle the event.

Figure 9:
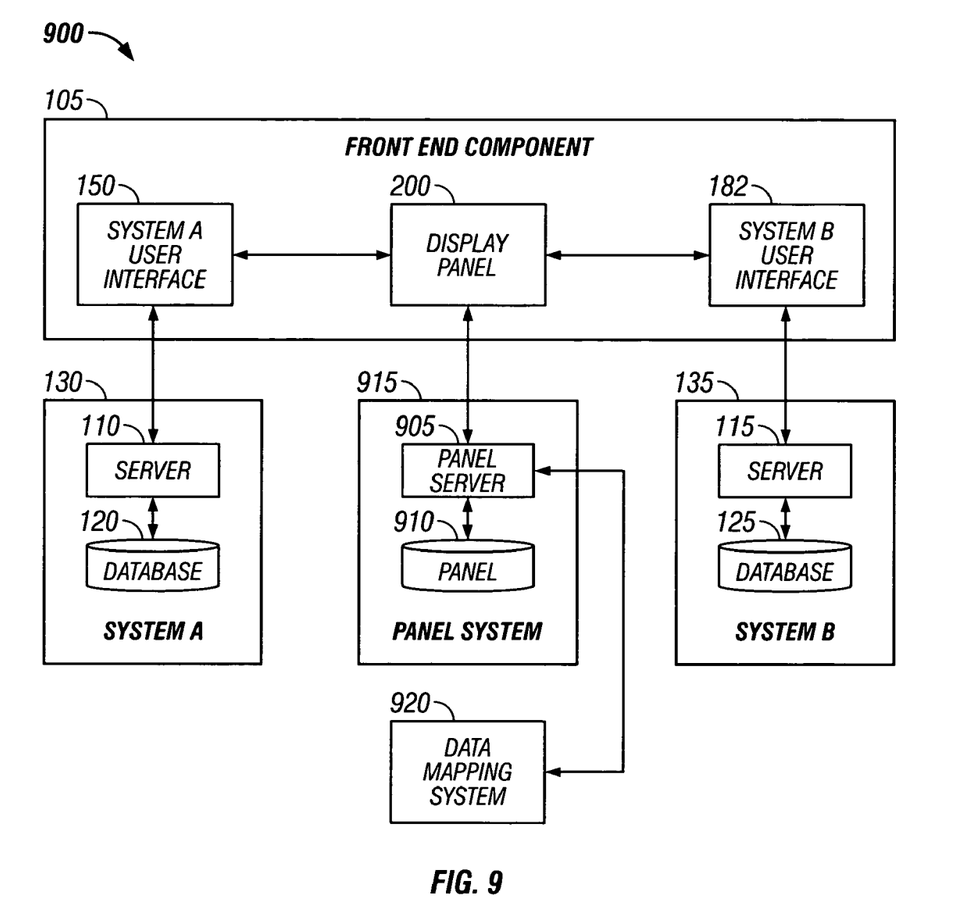
FIG. 9 shows an implementation of another system landscape where heterogeneous applications are integrated.

FIG. 9 shows a system landscape 900 that includes display panel intermediate 200 to exchange events between system A user interface 150 and system B user interface 182. In addition to front end component 105, application servers 110, 115, and databases 120, 125, system landscape 900 also includes a panel system 905 including a panel server 910 and a panel storage device 915. Panel server 905 executes instructions on panel storage 910 to create display panel 200 at front end component 105. As described above with regards to FIG. 2, display panel 200 can include system A user interface 150 and system B user interface 182 as, e.g., portlets, iViews, or HTML frames. System landscape 900 also includes a data mapping system 920 that is accessible by panel server 905.

Figure 10:
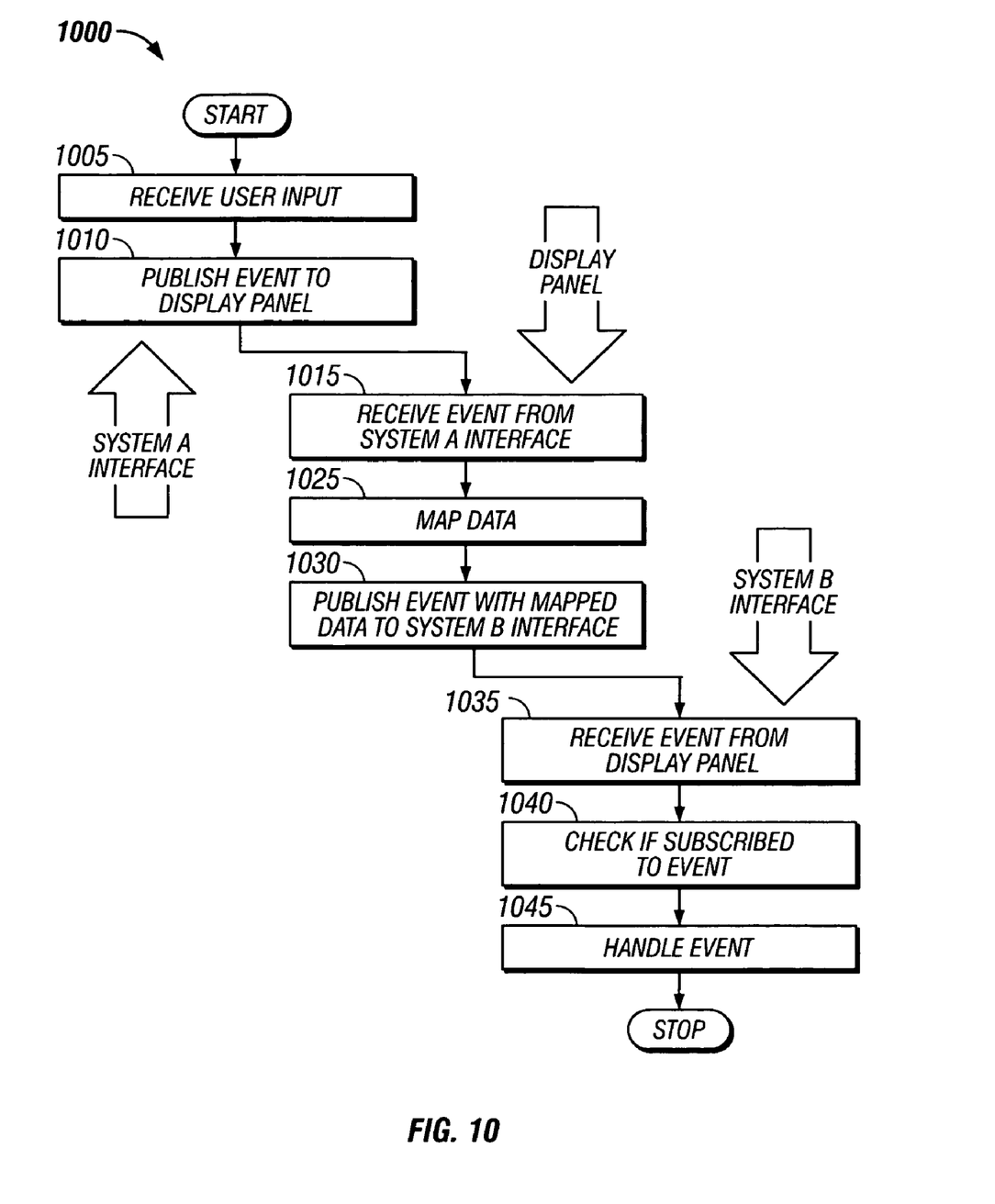
FIG. 10 shows another method in accordance with the invention for integrating heterogeneous applications.

In operation, system A user interface 150 and system B user interface 182 can exchange events using display panel 200 as an intermediate to achieve front end integration. As shown in FIG. 10, in particular, system A user interface 150 can receive user input that selects the event (step 1005). System A user interface 150 can publish the event to panel 200 using a shared protocol (step 1010).

Display panel 200 receives the event from system A user interface 150 (step 1015). If necessary, display panel 200 accesses data mapping system 920 to map the data from system A 130 to data that is valid in system B 135 (step 1025). For example, display panel 200 can map a key or a field from system A 130 to a key or a field that is valid in system B 135. Instead of accessing data mapping system 920 to map the data from system A 130 to data that is valid in system B 135, display panel 200 can access any location where mapping information, including mapping rules, can be found. Display panel 200 also publishes the event, with the original data or with a mapped data, to system B user interface 182 (step 1030).

System B user interface 182 receives the event from display panel 200 (step 1035) and checks to see if it is subscribed to the event (step 1040). If subscribed, system B user interface 182 handles the event (step 1045).

The following selected scenarios provide example illustrations of the methods and apparatus of implementations of the invention.

Scenario 1:

Two user interfaces pass data from two systems at a front end client. The two user interfaces have a defined, shared syntax for defining objects and a defined, shared technology to exchange the objects at the front end client.

The objects can be defined using, e.g., an XML definition, and the objects can be communicated by passing, e.g., an XML string between the interfaces. Alternatively, serialized Java objects can be exchanged between the interfaces.

The objects can be exchanged based on standards like EDI-X12 and ebXML. Alternatively, a Java serialized object, an XML string, or a JavaScript object can be modeled as an X12 file or as an ebXML message.

Scenario 2:

Two user interfaces pass data at a front end client using a portal solution such as the Enterprise Portals Client Framework (EPCF). In EPCF eventing, a serialized Java object can have a structure that is similar to the structure of an X12 file.

A single browser page can display a first user interface from a first vendor in a first frame a second user interface from a second vendor in a second frame. The user interfaces can also be, e.g. iView's in a portal. When the first user interface is rendered, a link is included. The link includes a serialized data object for eventing in, e.g., an X12 structure.

When a user clicks on this link in the first user interface, the second user interface receives and handles the event of the serialized data object. An application server for the second user interface converts the serialized data object into X12 standard.

Scenario 3:

Two interfaces communicate at a front end component without passing data between the systems. The two interfaces have a standardized language/protocol to communicate at the front end component. An interaction with one interface triggers an event to which the other interface reacts.

For example, a first interface receives user input requesting that a new favorite be added to a list of favorites. The first interface searches for the new favorite and calls a function indicating that the new favorite is to be added to the list of favorites. This function call is communicated to the second interface at the front end component, which subscribes by updating the list of favorites.

Scenario 4:

Two interfaces manage object information for two heterogeneous systems. Object identification can be transferred between the interfaces as a parameter of the event.

For example, a first system manages operational project data, while a second system stores additional costing and resource information. When a user selects a project using a first interface of the first system, the first interface triggers an event that transfers the project number to a second interface of the second system, in the front end.

The second interface receives the event, reads the project number, and accesses the second system to display the additional cost or resource data. If both systems use the same project number as a key, no key mapping is required. On the other hand, if both systems use a different key to identify the project, the second interface (or other component of the second system) can map the key to identify and display the additional cost or resource data.

Scenario 5:

Only a second system stores a particular, complex data object. A first interface of a first system can retrieve the data object from the second system so that it may be transferred into the first system. The data object may be formatted and communicated as a serialized structure using, e.g., XML.

For example, a second system can store a bill of material that includes multiple subassemblies. A particular sub-assembly from the bill of material is to be transferred into the first system. When a user selects the sub-assembly using the first interface, the first interface triggers an event that is distributed to the second interface. The second system handles the event, and transfers the sub-assembly to the first interface as a serialized string in an XML format, such as, e.g., ebXML. The first interface receives the serialized string, parses the XML format and creates a bill of material or a document structure for the sub-assembly within the first system.

The invention can be implemented in digital electronic circuitry, or in computer hardware, firmware, software, or in combinations of them. The invention can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the invention can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks. The processor and the memory can be supplemented by, or incorporated in special purpose logic circuitry.

To provide for interaction with a user, the invention can be implemented on a computer having a display device such as a CRT (cathode ray tube) or LCD (liquid crystal display) monitor for displaying information to the user and a keyboard and a pointing device such as a mouse or a trackball by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations of the invention have been described. Nevertheless, it will be understood that various modifications may be made without departing from the spirit and scope of the invention. For example, the steps of the invention can be performed in a different order and still achieve desirable results.

Two or more applications can be integrated by exchanging information at a user-interface level. Integration can be implemented with exchanges of any types of information, including events, index keys, metadata, or any combination thereof. An application generally can send and receive information to and from other applications through user interfaces, such as user interfaces 150 and 182. The exchange of information between or among heterogeneous applications can be implemented through, for example, JavaScript commands. Furthermore, the user interface can be established at any component level in a computer system. For example, user interfaces can be created and displayed by a middleware component of a computer system.

A user interface such as user interface 150 can include a variety of user input mechanisms through which a user can select operations or data in a heterogeneous application. For example, rather than or in addition to icons, a user interface can include menus such as pull down menus, or link identifiers such as buttons through which a user can select operations or data in a heterogeneous application. Interfaces for interacting with the two or more heterogeneous applications can be provided by, for example, an operating system, a browser, or a portal.

The exchange of information between or among heterogeneous applications can occur at a client side. The exchange of information, in these cases, does not require a integration on a server side.

The information that is exchanged can include information other than events. When events are exchanged, the events can specify only data, only operations, or both objects and operations. Events specify only data when there is no need to specify an operation. For example, system B user interface 182 can be dedicated to performing a single operation. System A user interface 150 can distribute events or other communications that only identify data (e.g., data objects) upon which system B user interface 182 is to perform the single, dedicated operation.

Information, such as metadata exchanged at the front end component, can be used by the backend systems to interact at the backend using a standard such as, e.g., X12.

An event can be broadcast to several user interfaces simultaneously and only handled by those user interfaces that are subscribed to the broadcast event. Exchanges of events can be effected by the heterogeneous applications, by the interfaces of the individual heterogeneous applications, by the general interface (as provided by the browser or portal) that includes the individual interfaces, or any combination thereof. The frames in a portal, for example, can broadcast and receive events.

An application can determine which other applications are to receive information, such as events, which the application sends. Alternatively, the application can broadcast information, such as events, to other applications and the other applications determine whether the information should be processed. Alternatively, there can be a computer program product that is dedicated to managing the exchange of information so that the applications with which a user is interfacing does not have to manage such exchange. Accordingly, other implementations are within the scope of the following claims.

What is claimed is:

1. A method for integrating heterogeneous applications, the method comprising:
   receiving instructions, from a portal, at a front end component for creating and displaying a first user interface of a first application of a first system and a second user interface of second application of a second system;
   simultaneously displaying the first user interface of the first system and the second user interface of the second system at the front end component;
   receiving an event over the first user interface of the first system;
   at the first user interface of the first application of the first system, addressing the event to the second user interface of the second application of the second system, distributing the event from the first user interface to the second user interface via the portal, wherein the event specifying at least one of an object or an operation in the second system, and wherein the first and second application being heterogeneous applications, wherein distributing the event comprises formatting the event using a protocol shared between the first user interface and the second user interface; and
   handling the event at the second system using the at least one of the object or the operation.

2. The method of claim 1, wherein the event is formatted to a semantic protocol shared with the second user interface.

3. The method of claim 2, wherein the semantic protocol comprises one of an ebXML, an EDI-X12, and a WDSL/UDDI protocol.

4. The method of claim 1, wherein distributing the event comprises distributing a key that can be mapped to identify data in the second system.

5. The method of claim 1, wherein the event is distributed via a Web service.

6. The method of claim 1, wherein receiving the event comprises receiving user input specifying the event.

7. The method of claim 1, further comprising receiving the event from the first user interface at the second user interface.

8. The method of claim 7, further comprising parsing the event.

9. The method of claim 1, further comprising receiving, at the first user interface, a key of the object from the second system.

10. A computer program product for integrating heterogeneous applications, the computer program product stored on a machine storage media execute by a processor for performing the step of:
    receiving instructions, from a portal, at a front end component for creating and displaying a first user interface of a first application of a first system and a second user interface of second application of a second system;
    simultaneously displaying the first user interface of the first system and the second user interface of the second system at the front end component;
    receiving an event over the first user interface of the first system;
    at the first user interface of the first application of the first system, addressing the event to the second user interface of the second application of the second system, distributing the event from the first user interface to the second user interface via the portal, wherein the event specifying at least one of an object or an operation in the second system, and wherein the first and second application being heterogeneous applications, wherein distributing the event comprises formatting the event using a protocol shared between the first user interface and the second user interface; and
    handling the event at the second system using the at least one of the object or the operation.

11. The computer program product of claim 10, wherein the computer program product includes instructions to cause the processor to distribute an event to the second user interface to convey the identity of the process to the second user interface.

12. The computer program product of claim 10, wherein the computer program product includes instructions to cause the processor to address and convey a key of the process to the second user interface.

13. The computer program product of claim 10, wherein the computer program product includes instructions to cause the processor to receive the process from the second system.

14. The computer program product of claim 10, wherein the computer program product includes instructions to cause the processor to receive a result of performing the process from the second system.

15. The computer program product of claim 10, wherein the computer program product includes instructions to cause the processor to use a technical protocol shared with the second user interface to convey the identity of the process to the second user interface.

16. The computer program product of claim 15, wherein the computer program product includes instructions to cause the processor to use one of a name, an attribute name, or an object name to convey the identity of the process to the second user interface.

17. The computer program product of claim 15, wherein the computer program product includes instructions to cause the processor to use one of an XML string and an XML file to convey the identity of the specified process to the second user interface.

18. The computer program product of claim 10, wherein the computer program product includes instructions to cause the processor to use a semantic protocol shared with the second user interface to convey the identity of the specified process to the second user interface.

19. The computer program product of claim 18, wherein the computer program product includes instructions to cause the processor to use one of ebXML, X12, and UDDI to convey the identity of the specified process to the second user interface.

20. The computer program product of claim 10, wherein the computer program product includes instructions to cause the processor to address and convey the specified process directly to a second graphical user interface.

21. The computer program product of claim 10, wherein the computer program product includes instructions to cause the processor to:

provide a user interface in a browser page at the front end; and convey the identity of the specified process to the second user interface in the same browser page.

* * * * *

UNITED STATES PATENT AND TRADEMARK OFFICE
CERTIFICATE OF CORRECTION

PATENT NO.       : 7,607,137 B2                                    Page 1 of 1
APPLICATION NO. : 10/188352
DATED            : October 20, 2009
INVENTOR(S)      : Hauser et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1009 days.

Signed and Sealed this

Twelfth Day of October, 2010

David J. Kappos
*Director of the United States Patent and Trademark Office*